MATERIAL BEATING AND SPREADING APPARATUS

Original Filed Feb. 19, 1959 3 Sheets-Sheet 1

INVENTOR.
JOSEPH B. KUCERA
BY ERIC M. MCELHINNEY
Lowell & Henderson
ATTORNEYS

MATERIAL BEATING AND SPREADING APPARATUS

Original Filed Feb. 19, 1959 3 Sheets-Sheet 2

INVENTOR.
JOSEPH B KUCERA
BY ERIC M. McELHINNEY
Lowell & Henderson
ATTORNEYS

MATERIAL BEATING AND SPREADING APPARATUS

Original Filed Feb. 19, 1959 3 Sheets-Sheet 3

INVENTOR.
JOSEPH B. KUCERA
BY ERIC M. McELHINNEY
Lowell & Henderson
ATTORNEYS

United States Patent Office

Re. 25,503
Reissued Dec. 24, 1963

25,503
MATERIAL BEATING AND SPREADING APPARATUS

Joseph B. Kucera, Traer, Iowa, and Eric M. McElhinney, 754 Ainsworth St., Jesup, Iowa, assignors of one-third to Rudolph L. Lowell, Des Moines, Iowa Original No. 2,958,530, dated Nov. 1, 1960, Ser. No. 794,306, Feb. 19, 1959. Application for reissue Feb. 2, 1962, Ser. No. 172,376
5 Claims. (Cl. 275—6)

Matter enclosed in heavy brackets [ ] appears in the original patent but forms no part of this reissue specification; matter printed in italics indicates the additions made by reissue.

This invention relates to apparatus for transporting soil enriching material, and more particularly to a transportable apparatus adapted to carry a load of fertilizing material, to break up or pulverize the material, and to spread or distribute the material uniformly in a path over the ground.

It is an object of this invention to provide an improved fertilizer spreader.

Another object of this invention is to provide a spreader having means in combination for carrying a load of fertilizer, for moving the fertilizer toward one end of the spreader, for pulverizing the fertilizer, and for spreading the pulverized fertilizer uniformly over the ground.

A further object of this invention is to provide flexible means swingably mounted on a shaft for rotation for pulverizing and spreading a fertilizer, the flexible means being capable of wrapping around the shaft for working on the fertilizer in close quarters.

Another object of this invention is to provide a spreader having means for conveying a fertilizer into a flexible means swingably mounted for rotation for pulverizing and spreading the fertilizer which flexible means is self cleaning and the length of which is readily adjustable for contiguous operative relation with the conveying means.

Yet another object of this invention is to provide flexible means for pulverizing and spreading a fertilizer, which flexible means are swingably mounted in balanced relation on a shaft in a novel pattern to provide for spreading the fertilizer uniformly over a path of a width greater than the length of the shaft.

A further object of this invention is to provide a spreader with a pair of oppositely rotatable, flexible means arranged for coaction to pulverize and spread fertilizer carried in the spreader, and wherein one of the flexible means has a working extent above the sides of the spreader and is adjustably movable to a plurality of positions about the other flexible means to vary the direction of the spreading action relative to the ground.

It is another object of this invention to provide a spreader having in combination flexible beater means for pulverizing and spreading fertilizer carried by the spreader, and adjustable means for deflecting the fertilizer to aid in regulating the spreading action in directions laterally of the spreader.

A further object of this invention is to provide a spreader having means for conveying fertilizer to one end of the spreader, means at such end for pulverizing and spreading the fertilizer, and means for operating the conveying means and the pulverizing and spreading means concurrently or independently of each other.

Another object of this invention is to provide a spreader with flexible beater means rotated in a manner relative to fertilizer conveyed into the flexible beater means so that there is no scattering or throwback of the material into the spreader.

Yet another object of this invention is to provide a spreader having beater means of a flexible nature so as to eliminate damage thereto during operation upon contacting any foreign matter in the fertilizer material being spread.

A further object of this invention is to provide a spreader having flexible beater means structurally arranged in a novel maner so as to require a minimal power requirement for the operation of the beater means.

Yet another object of this invention is to provide a spreader having a beater means of a flexible nature whereby material may be discharged from the spreader without operation or change of position of the beater means.

Still another object of this invention is to provide a spreader for fertilizer material having beater and spreader means which may be covered in such a manner to protect the operator of the spreader.

It is a further object of this invention to provide a spreader having flexible beater means for effectively breaking up fertilizer material, irrespective of temperature conditions, so as to eliminate the spreading of clods.

These and other objects and features will become readily apparent from reference to the following description and the accompanying drawings, wherein.

Figure 1:
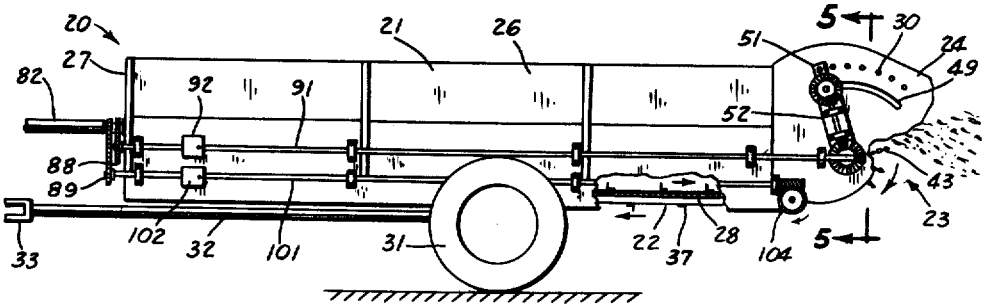
FIG. 1 is a side elevational view of one embodiment of the spreader apparatus of this invention, with certain parts broken away for the purpose of clarity.

[Referring now to the drawings and particularly to FIG. 1, the fertilizer spreader of this invention is indicated generally at 20, and comprises a box 21, a conveyor unit 22, and a beater and spreader assembly 23, for receiving material from the conveyor unit 22.]

Referring now to the drawings and particular to FIG. 1, the *mobile framed* fertilizer spreader of this invention is indicated generally at 20, and comprises a box *or container opening to the rear* 21, a *floor* conveyor unit 22, and a *flail* beater and spreader assembly 23, for receiving material from the conveyor unit 22.

Figure 12:
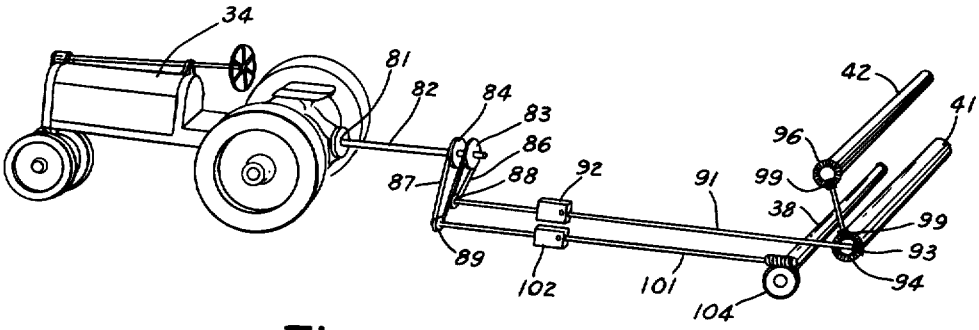
FIG. 12 is a schematic showing of the driving mechanism from the tractor to the conveyor means and the beater means for the spreader of FIG. 1.

The box 21 includes a pair of side walls 26, a front end wall 27, and a bottom wall or floor 28 and is supported on an axle 29 having wheels 31. Extended forwardly from the axle is a draft tongue 32 having a clevis 33 by means of which the spreader 20 may be connected to and drawn by a tractor 34 (FIG. 12).

The conveyor unit 22 (FIGS. 2 and 3) includes a pair of transversely spaced, longitudinally running endless chains 35 and 36 cross-connected by a plurality of transverse, longitudinally spaced slats 37. The unit is advanced so that its upper run and the slats thereon move rearwardly over the upper surface of the floor 23, the lower run returning beneath the floor. Appropriate shafts 38 (only the rear one of which is shown, FIGS. 3 and 5) are mounted transversely at each end of the box 21 and carry sprockets 39 at each end for the chains 35 and 36.

[The beater and spreader assembly 23 comprises a pair of vertically spaced units 23a and 23b (FIG. 3), which include, respectively, shafts 41 and 42 (FIG. 3) each of which is provided with a plurality of longitudinally spaced chains 43 and 44 respectively.]

The beater and spreader assembly 23 comprises a pair of vertically spaced units 23a and 23b (FIG. 3), which include, respectively, *rotors or* shafts 41 and 42 (FIG. 3) each of which is provided with a plurality of longitudinally spaced *flails or* chains 43 and 44, respectively. *The chains are pivotally connected to their respective shafts and each chain includes a series of pivotally connected together links each of which links comprise a rigid member of a flail.* The lowermost shaft 41 has a stub shaft 45 (FIG. 5) at each end thereof for mounting in bearing units 46 secured to side plates 24 which constitute extensions of the box side walls 26. As best appears in FIG. 3, the shaft 41 is spaced rearwardly and upwardly from the rear end 47 of the conveyor unit 22.

The uppermost shaft 42 is also provided with a stub shaft 48 (FIG. 5) at each end which extends through an arcuate slot 49 formed in each side plate 24 in a radial manner about the axis of the lower shaft 41. Each stub shaft 48 is mounted in a bearing unit 50 (FIG. 5) carried on the upper end 51 of a pivot arm 52 spaced outwardly from and extended parallel to an adjacent side plate 24. Also carried by the pivot arm upper end 51 is a locking device 25, such as a nut, bolt and washer assembly, for insertion through any one of a plurality of spaced holes 30 formed in a side plate 24 in a pattern best illustrated in FIG. 3. The lower end 53 (FIG. 5) of a pivot arm 52 is secured to a bearing unit 54 that is rotatably mounted on the lower shaft 41 by means of the stub shaft 45.

By the provision of the pivot arm and slot arrangement for the shaft 42, it may be seen that the upper beater and spreader unit 23b is movable radially about the lower unit 23a, whereby the tangential direction of spreading action by the coaction of the chains 43 and 44 may be varied for a purpose described hereinafter.

Figure 4:
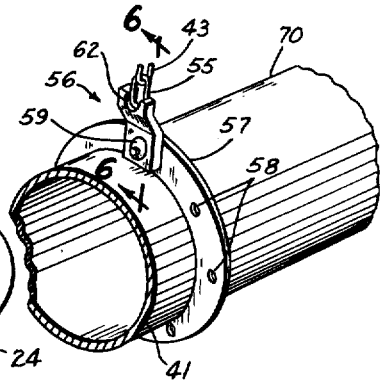
FIG. 4 is an enlarged, fragmentary perspective view of a beater shaft showing the structure for connecting a flexible chain to the shaft.
Figure 5:
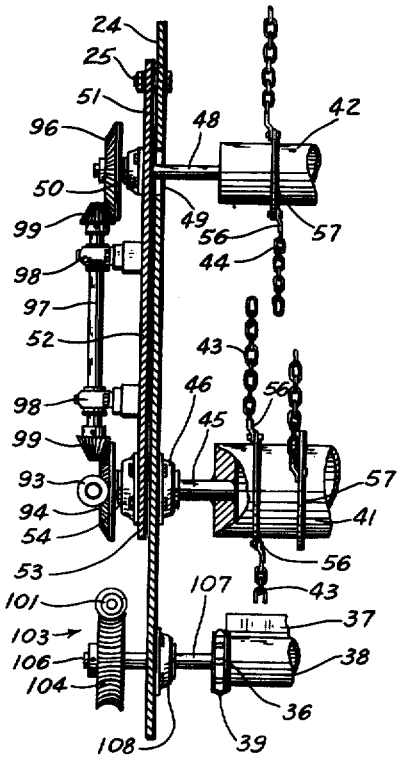
FIG. 5 is an enlarged, foreshortened fragmentary sectional view taken along the line 5—5 in FIG. 1, with certain parts broken away for the purpose of clarity.
Figure 6:
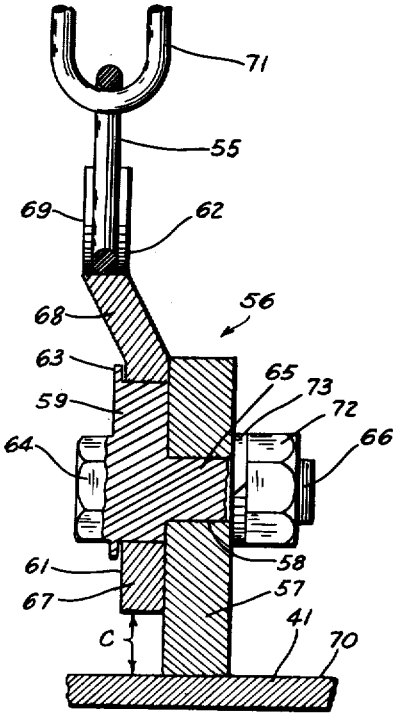
FIG. 6 is an enlarged, fragmentary sectional view taken along the line 6—6 in FIG. 4.

Referring now specifically to FIGS. 4–6, a chain 43 is secured at its inner end link 55 to a connecting device 56 adjustably mounted on a ring 57 for adjustable movement radially of the shaft 41. The ring is of a rectangular shape in transverse cross-section and encircles and is secured to the shaft 41. A plurality of arcuately spaced, transversely extended holes 58 are formed in the ring 57. The connecting device 56 includes an eccentric cam 59 and a member 61 rotatably mounted on the cam 59. A flange 63 (FIG. 6) and a cap screw head 64 are formed integrally on one side of the cam 59, while a shank 65 having an outer threaded end 66 is formed on the other side thereof, which shank is insertable through a selected hole 58. A lock nut 72 and washer 73 may be used to secure the eccentric cam 59 to the ring 57.

The rotatable member 61 includes a flat portion 67 (FIG. 6) one end of which is rounded and rotatably retained on the cam 59 by the flange 63 and the ring 57, with the other end offset at 68 to provide an outer end 69 laterally spaced from the ring 57 (FIG. 6). A semicircular cut-out 62 is formed in the end 69 for the welded reception therein of the chain end link 55.

It may be readily observed that to change the effective length of a chain 43 requires merely an unloosening of the nut 72 and a rotation of the cap screw head 64, whereby to rotate the eccentric cam 59 and therefore raise or lower the member 61 relative to the ring 57. The rotation of the cam 59 to a predetermined position thus determines the radial clearance C (FIG. 6) of the rotatable member 61 from the peripheral surface 70 of the shaft 41 when the member 61 is in a working position as illustrated in FIGS. 4–6. By providing for this fine adjustment of the rotatable member 61 relative to the shaft 41, the outer end of each chain 43 at its end link 76 (FIG. 3) may be positioned for contiguous coaction with the upper edge of each slat 37, or in some instances with the bottom 28 of the box 21.

The spacing C is also of such an extent that irrrespective of the eccentric position of the cam 62, the member 61 may rotate substantially ninety degrees to either side of an upright position, or downwardly against the peripheral surface 70 of the shaft 41, whereby in this position the height of the rotatable member 61 about the surface [69] *70* is not greater than the height of the ring 57 so as not to protrude thereabove. In other words, when a chain 43 is wrapped about the shaft 41, the member 61 in its rotated position lies within the radial confines of the ring 57.

Of note, the inner end link 55 is secured to the offset outer end 69 in the same plane therewith whereby the next link 71 (FIG. 6) extends in a plane substantially normal to the plane of the offset end 69. The lateral extent of the offset 68 is such that upon rotation of the rotatable member 61 and its chain 43, about the eccentric cam 62, the link 71 will clear the ring 57, whereby to allow for an unimpeded wrapping of the chain 43 about the shaft 41.

Figure 7:
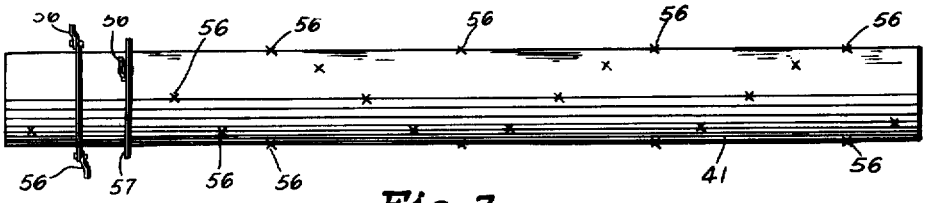
FIG. 7 is an enlarged side elevational view of a beater shaft, showing the spiral pattern of the chain connections and the reverse pitch thereof from the center of the shaft.
Figure 8:
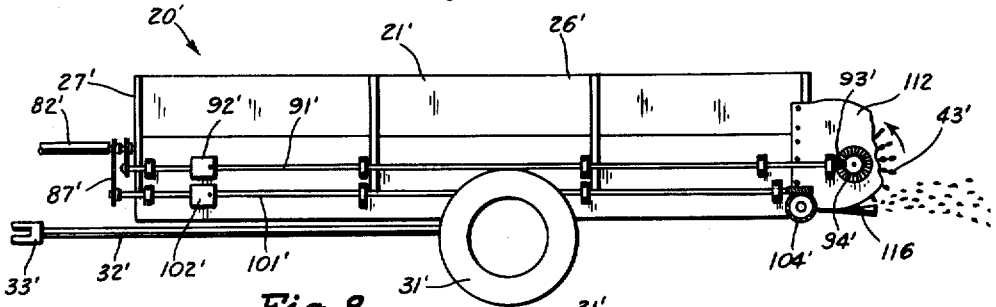
FIG. 8 is a side elevational view of a modified form of the spreader apparatus of this invention, with certain parts broken away for the purpose of clarity.

As shown diagrammatically in FIG. 7, the connecting devices 56 are arranged in a staggered and spiral pattern around the shaft 41, and with the paths of the pattern being of a reverse pitch to opposite sides of the longitudinal center of the shaft. The spiral path pattern is obtained by an equidistant longitudinal spacing on the shaft 41 of the rings 57 and by an equidistant radial spacing of the ring holes 58. Thus, by staggering a connecting device placement on one ring relative to the adjacent ring, and by sequentially continuing the same staggered placement as to the remainder of the rings, the spiral path pattern of devices 56 is obtained.

Figure 3:
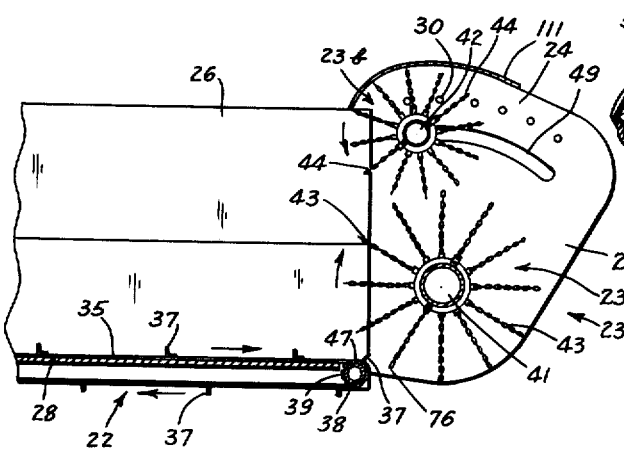
FIG. 3 is an enlarged, fragmentary sectional view taken along the line 3—3 in FIG. 2.

In actuality, a pair of spiral paths are provided on each side of the shaft 41 by means of the connection in diametrically opposite holes 58 of each string 57 of a connecting device 56 and the chain 43 therewith (see FIGS. 3 and 7). By this arrangement, the inherent advantage of the spiral pattern reulting in an even load or resistance to the driving mechanism is maintained, while increasing the pulverizing and spreading capacity of the conventional single path of chains. More than two spiral paths of chains could of course be provided for, it being recommended that the chains connected to a single ring 57 be equally arcuately spaced.

To prevent the chains 43 for each pair of oppositely mounted devices 56 from clashing when the chains are wrapped around the shaft 41, the device for one chain is mounted on one side of the ring 57 whereas the device for the diametrically opposite chain is mounted on the other side of the ring (FIG. 5). This arrangement is maintained for each adjacent ring in such a manner that the chains in each of the two pairs of spiral paths are longitudinally spaced an equal distance apart.

By the provision of the reverse pitch spiral pattern, it may be readily observed that an auger-like, spiral flight effect will be had by the chains 43 upon rotation of the shaft 41, the auger effect being directed outwardly from the longitudinal center of the shaft toward each end of the shaft. Thus, any material spread by the chains 43 on the shaft 41 will be moved outwardly and laterally from each side of the shaft whereby to provide for a path having a spread considerably wider than the length of the shaft 41 itself or of the width of the box 21.

With respect to the upper beater and spreader unit 23b, the chain arrangement for the upper shaft 42 may be substantially the same as that just described for the lower shaft 41. However, as it is not necessary for the chains 44 to travel in a contiguous manner relative to any part of the structure, the means for connecting the chains 44 to the shaft 42 may be conventional. For purposes of obtaining the maximum coaction between the two sets of chains 43 and 44, it is recommended that the respective spiral patterns for the shafts 41 and 42 be axially offset from each other to a degree such that, upon rotation, each chain of one shaft swings intermediate and approximately centered between a pair of chains on the other shaft (FIG. 5). This arrangement also provides for the lengths of the chains for the respective shafts being such, that upon rotation their radii may intersect (FIG. 3).

In the use and operation of the spreader 20, the conveyor unit 22 and the beater and spreader unit 23 are operated by means hereinafter described, whereby the fertilizer material in the box 21 is moved toward the rear of the box where it is concurrently beaten and flailed by the chains 43 of the lower unit 23a and picked up and thrown by those chains in their direction of rotation (FIG. 3) toward and into the path of the upper unit 23b. Depending on the height of the material, as for example, should it be piled as high as the side walls 26, the upper unit 23b also beats and flails the conveyed material while throwing it in a radial direction (FIG. 3) toward and into the path of the lower unit 23a.

It may readily be appreciated, that by the coaction of the chains 43 and 44, the thrown material is subjected to an even more effective pulverizing action while being tangentially discharged from between the units 23a and 23b and spread rearwardly of the box in a path considerably wider than the width of the shafts 41 and 42 or the box 21, due to the reverse spiral pitch pattern of the chains. For the purpose of *protecting the operator of the spreader from material* [preventing material from being] flung upwardly by the unit 23b, a transversely extended shield 111 having a curvature to fit the tops of the side plates 24 may be mounted thereon.

Referring again to FIG. 3, the direction in which the manure or other material is thrown from between the shafts 41 and 42 relative to the ground may be changed by merely relocating the upper end 51 of each pivot arm 52 in one of the holes 30 provided therefor in the side plates 24. Due to the slot 49 and the holes 30 being substantially radially arranged about the pivot point of the arm 52 at the bearing unit 54, no change of the driving mechanism is required for the movement of the pivot arm 52.

To operate the conveyor unit 22 and the beater and spreader unit 23, power is taken from the rear power take-off 81 (FIG. 12) of the tractor 34 by a shaft 82 to a pair of pulleys 83 and 84 mounted at the front of the box 21 (FIG. 1). A pair of chain belts 86 and 87 are trained about the respective pulleys 83 and 84 for transmitting the drive to another pair of pulleys 88 and 89, respectively.

From the pulley 88, a drive shaft 91 is extended along the side of the box 21 and through a clutch disconnect unit 92 to a bevel pinion gear 93 (FIG. 5). Drive is imparted from the pinion gear 93 to a bevel gear 94 inserted through the bearing unit 54 and connected to the stub end 45 of the lower shaft 41 for rotating the shaft.

To obtain power for the upper shaft 42, another bevel gear 96 (FIG. 5) is mounted directly above the gear 94 in the upper bearing unit 50 on the pivot arms 52 and in operative connection with the stub shaft 48. A transfer shaft 97 is then mounted on a pair of bearing units 98 secured to the pivot arm 52, and provided with a bevel pinion gear 99 at each end thereof in meshed engagement with the bevel gears 94 and 96. It may thus be seen, that irrespective of the selected position of the upper end 51 of the pivot arm on the side plate 24 to which it is secured, the capability of the lower pinion gear 99 to "walk" around the bevel gear 94 ensures a constant transmission of power to the upper shaft 42. It is to be noted that by the provision of the transfer shaft 97 and the pinion gears 99, the direction of rotation of the upper gear 96 is reverse or opposite that of the lower gear 94, whereby the shafts 41 and 42 rotate in opposite directions.

Power for the conveyor unit 22 is transmitted from the pulley 89 (FIGS. 1 and 12) by a shaft 101 extended alongside the box 21 below the shaft 91 and through a clutch disconnect unit 102 to a worm gear 103 (FIG. 5). The wheel part 104 of the gear 103 is securely mounted on an extension 106 of a stub shaft 107, there being a stub shaft 107 at each end of the rear conveyor shaft 38 rotatably mounted in a bearing unit 108 provided therefor (FIG. 5).

To one familiar with the spreading of manure, it will be appreciated that the utilization of flails or beaters in the sense of flexible chains is much more effective than the use of any type of solid beater or cutter, particularly where the manure is matted or hardened. In this respect, the chains also have the advantage of being self cleaning. The capability of chains to yield when encountering solid objects in the manure or other material being spread is also to be appreciated as saving wear and tear on the flails, and also on the driving mechanism.

Other advantages of the present structure during the pulverizing and spreading action include the capability particularly of the chains 43 to wrap snugly or smoothly about their shaft so as to be able, in effect, to work their way out of material in abutting relation with the shaft at the beginning of its rotation. This advantage is provided by the rotary movement of each member 61 against its shaft, along with the provision of the offset end 69 eliminating any catching by the chain links to impair the smooth wrapping. By the use of the rings 57, ease and certainty of assembly of the chains in their proper pattern is afforded while eliminating corners or protrusions relative to the shafts on which pieces of rope, wire, etc., sometimes found in the manure may catch and wrap about, which wrapping would lessen the effectiveness of the operation. In furtherance of this anti-wrapping feature, the flexibility of the chains prevents a build-up or matting of the fertilizer material at the bases of the chains and about their shaft, due primarily to their capability of throwing off any foreign matter such as wire, twine, etc., tending to wrap about the chains. Importantly, the chains will effectively break up the fertilizer material irrespective of temperature conditions, so as to eliminate the spreading of clods.

It may well be appreciated that the box 21, which is normally connected to and drawn by the tractor 34, is also useable for merely transporting any type of material. A backboard (not shown) may be mounted at the rear of the box and extended between the sides to prevent the material from spilling out. During the transporting, the shaft 82 may be disconnected from the tractor rear power takeoff 81, or both disconnect units 92 and 102 may be set so that power is not transmitted therethrough to the rear of the spreader. With the shafts 41 and 42 stationary, their flexible chains 43 and 44 hang from their connections.

Figure 2:
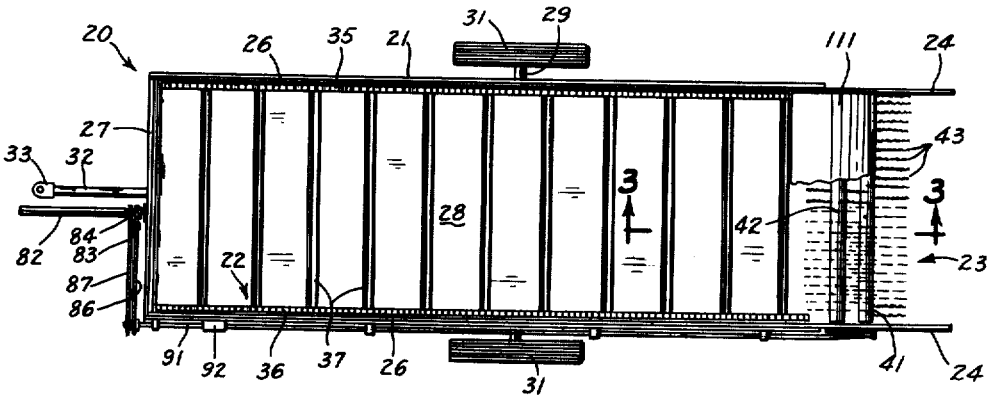
FIG. 2 is a top plan view of the spreader apparatus of FIG. 1, with a portion of the shield broken away to show the flexible beaters.

Should it be desirable to unload the material being transported by utilizing the conveyor unit 22 without operating the beater and spreader unit 23, it may readily be seen, that assuming the tractor power is transmitted only through the disconnect unit 102 to the conveyor unit drive shaft 38, operation of the unit 22 in the direction indicated by the arrows in FIGS. 1 and 2 will mechanically move the load rearwardly over the floor 28 and out the rear end of the box 31. Advantageously, as the beater chains are flexible, their presence in the path of the material being moved out of the box 21 in no way impairs such unloading. The beater and spreader unit 23 may of course be operated independently of the conveyor unit 22.

It may therefore be summarized that a particularly effective spreader is disclosed herein having means in combination for carrying a load of manure or fertilizer, for moving the fertilizer toward one end of the spreader, for pulverizing the fertilizer between a pair of beater means, and for spreading the fertilizer uniformly over a path on the ground considerably wider and on both sides of the spreader box.

A modified form of the spreader is shown in FIGS. 8 through 11. All elements of the modified spreader which are substantially identical to those of the spreader shown in FIGS. 1–7, 12 are indicated by the same reference numeral with a prime.

The modified spreader 20' is provided only with the lower beater and spreader unit 23a' including the lower shaft 41' and its associated chains 43' for the purpose of beating and spreading the manure or other fertilizer material moved into it by the conveyor unit 22'. The shaft 41' is rotatably mounted at each end in a pair of side plates 112 extended rearwardly of the box sides 26', and is located rearwardly and upwardly of the rear end 47' (FIG. 10) of the conveyor unit 22'. A shield or cover 113 may be placed over the upper portions of the plates 112 and extended transversely between them to substantially cover the shaft 41' and its chains 43' when rotating.

Figure 10:
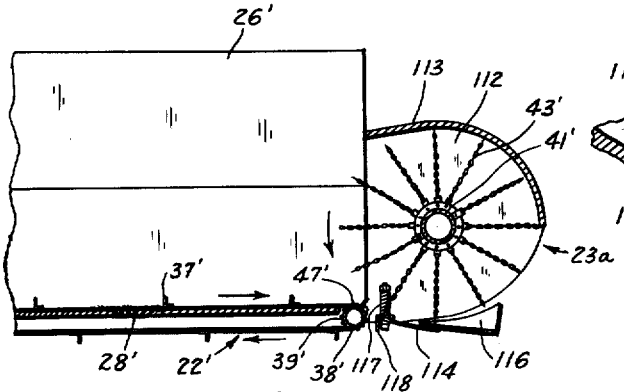
FIG. 10 is an enlarged, fragmentary sectional view taken along the line 10—10 in FIG. 9.
Figure 11:
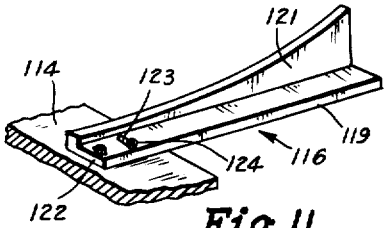
FIG. 11 is an enlarged, perspective view of a deflector plate utilized in the modified apparatus of FIG. 8.

It has been found that by rotating the shaft 41' in the direction of the arrow in FIG. 10, whereby the beater chain 43', rather than moving upwardly as do the chains 43 in FIG. 3, move downwardly into the fertilizer material carried by the conveyor unit 22', an effective pulverization and discharge of the material is obtained. A reversal of the rotation of the shaft 41' over that of the shaft 41 may readily be accomplished by merely shifting the position of the bevel pinion gear 93' one hundred and eighty degrees (FIG. 8) from its position as shown in FIGS. 1 and 12. To complement the spreading action of the shaft 41' and chains 43', a tail plate 114 and a plurality of *deflector* [deflector] members 116 are provided. The tail plate 114 is curved concavely longitudinally of the box 21' and extends transversely across the rear of the box, being mounted at its forward edge by a pair of shock absorber units 117 to a transversely extended angle member 118 mounted at the rear of the box. By means of the units 117, the tail plate 114 is capable of a floating movement downwardly from the angle member 118.

The deflector members 116 (FIG. 9) are mounted in transversely spaced relation on top of the tail plate 114, and each member 116 comprises a flat, elongated plate 119 (FIG. 11) with an upstanding concavely curved leg 121 along one side thereof.

To provide for a lateral adjustment relative to the tail plate 114, each deflector member 116 (FIG. 11) is pivotally mounted at its front end 122 to the plate and is provided with an arcuate, elongated slot 123 adjacent the front end. The pivotal movement of a member 116 is limited by a cap screw 124 inserted through the slot 123 and into the tail plate 114, the cap screw 124 also being capable of tightening the deflector member against the plate 114 to retain its adjusted position.

Figure 9:
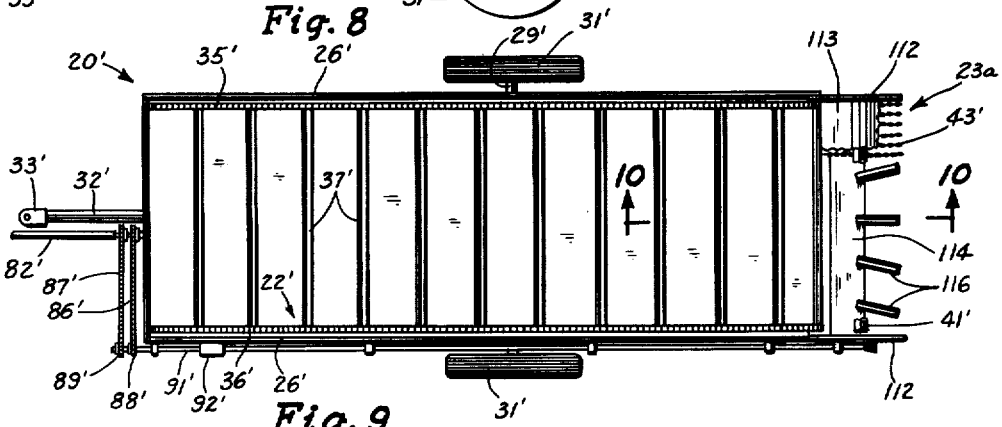
FIG. 9 is a top plan view of the spreader apparatus of FIG. 8, with certain parts broken away for the purpose of clarity.

Referring to FIG. 9, it may be seen that the deflector members 116 are arranged in a fan-like manner, thus determining to a certain extent the width of the path of material being spread, and that the members 116 on each side of the longitudinal center of the tail plate 114 are arranged with their upstanding legs 121 on the side thereof next to the center.

The uses of the spreader 20' are the same as those described hereinbefore as to the spreader 20. When power from the tractor rear power take-off 81 (FIG. 12) is directed to both the conveyor unit 22' and the shaft 41', the unit 22' moves material contained within the box 21' rearwardly along the floor 28' into the chains 43' rotating in the direction indicated (FIG. 10). The material is then pulverized by the flexible beater chains 43' and discharged rearwardly across the yieldable tail plate 114 and past the deflector members 116. The width of the discharge is adjustable by the members 116, whereby the spread of the path by the fertilizer material may be wider than the width of the box 21.

Although several embodiments of the invention have been disclosed herein, it is to be noted that various other alterations and modifications may be made within the full scope of the invention as defined by the appended claims.

We claim:

1. A spreader apparatus including a box, means on said box for conveying material to be spread rearwardly of said box, spreader and beater means mounted on said box and including a rotatable shaft extended transversely of said box, a plurality of ring elements secured in longitudinally spaced relation about said shaft, at least one *rotatable circular cam releasably* [eccentric cam] secured to each ring element, *with each cam having a cylindrical eccentrically mounted shank projected laterally from one side thereof, said ring having a transverse opening for rotatably receiving said shank, means on said shank for releasably clamping said cam against rotation relative to said ring, said cam and shank being rotatable as a unit relative to said ring on release of said clamping means,* a connecting member rotatably mounted on said cam for adjustment radially of said shaft on rotation of said cam, and a chain secured to said connecting member, the outer free end of which is movable in a contiguous relation with said conveying means at the rear end of said box.

2. In a material spreader apparatus including a box, an endless conveyor mounted on and extended longitudinally of said box for conveying material to be spread rearwardly of said box, spreader and beater means mounted on said box and including a rotatable shaft extended transversely of said box and located upwardly from the rear end of said endless conveyor, a plurality of beaters pivoted on said shaft for free swinging movement in planes extended transversely of said shaft and of a length such that, on rotation of said shaft, said beaters are radially extended with the free ends thereof movable contiguous to the rear end of said conveyor, *with the beaters being arranged in a spiral pattern about the shaft and with the paths of the pattern being of a reverse pitch to opposite sides of the longitudinal center of the shaft,* means for rotating said spreader and beater means in a direction to provide for the beaters moving downwardly into the material moved by the endless conveyor, and cover means on said box to deflect downwardly any material thrown upwardly and forwardly by said beaters, *the reverse pitch spiral pattern of the beaters acting to spread the material in a path having a width greater than the length of said shaft.*

[3. The invention according to claim 2 wherein a concave member is supported on said box and extended rearwardly from the rear end of said conveying means with the free ends of said beaters movable in a contiguous relation with said concave member.]

4. In a spreader apparatus including a box, having a bottom wall, side walls and an open end, an endless conveyor supported on said box for movement longitudinally across said bottom wall to move material toward said open end, rotatable beater and spreader means extended transversely of said box, means rotatably supporting said beater and spreader means from said side walls such that the axis of rotation thereof is located upwardly from the end of said conveyor at the open end of said box, said beater and spreader means including a plurality of pivoted beaters freely swingable in planes extended transversely of said beater and spreader means and of a length such that, on rotation of said beater and spreader means, said beaters are radially extended with the free ends thereof movable closely adjacent said end of the conveyer, *with*

*the beaters being arranged in a spiral pattern about the shaft and with the paths of the pattern being of a reverse pitch to opposite sides of the longitudinal center of the shaft,* means for rotating said beater and spreader means in a direction to provide for the beaters moving downwardly into the material moved by said conveyor, and cover means on said box to deflect into said box any material thrown upwardly by that portion of the beater and spreader means remote from said end of the conveyor, *the reverse pitch spiral pattern of the beaters acting to spread the material in a path having a width greater than the length of said shaft.*

[5. The invention according to claim 4 wherein a concave member is supported on said box and extended outwardly from said end of the conveyor means, with the free ends of said beaters being movable closely adjacent said concave member.]

*6. In a material spreader apparatus including a box, an endless conveyer mounted on and extended longitudinally of said box for conveying material to be spread rearwardly of said box, spreader and beater means mounted on said box and including a rotatable shaft extended transversely of said box and located upwardly from the rear end of said endless conveyer, a plurality of beaters pivoted on said shaft for free swinging movement in planes extended transversely of said shaft and of a length such that, on rotation of said shaft, said beaters are radially extended with the free ends thereof movable contiguous to the rear end of said conveyer, means for rotating said spreader and beater means in a downward direction to provide for the beaters moving downwardly into the material moved by the endless conveyer, cover means on said box to deflect downwardly any material thrown upwardly and forwardly by said beaters, and a concave member supported on said box and extended rearwardly from the rear end of said conveying means with the free ends of said beaters movable in a contiguous relation with said concave member.*

*7. In a spreader apparatus including a box having a bottom wall, side walls and an open end, an endless conveyer supported on said box for movement longitudinally across said bottom wall to move material toward said open end, rotatable beater and spreader means extended transversely of said box, means rotatably supporting said beater and spreader means from said side walls such that the axis of rotation thereof is located upwardly from the end of said conveyer at the open end of said box, said beater and spreader means including a plurality of pivoted beaters freely swingable in planes extended transversely of said beater and spreader means and of a length such that, on rotation of said beater and spreader means, said beaters are radially extended with the free ends thereof movable closely adjacent said end of the conveyer, means for rotating said beater and spreader means in a direction to provide for the beaters moving downwardly into the material moved by said conveyer, cover means on said box to deflect into said box any material thrown upwardly by that portion of the beater and spreader means remote from said end of the conveyer, and a concave member supported on said box and extended outwardly from said end of the conveyer means with the free ends of said beaters being movable closely adjacent said concave member.*

References Cited in the file of this patent or the original patent

UNITED STATES PATENTS

| | | |
|---|---|---|
| 230,871 | George | Aug. 10, 1880 |
| 894,261 | Dyk | July 28, 1908 |
| 968,788 | Olander | Aug. 30, 1910 |
| 1,185,619 | Blum | June 6, 1916 |
| 1,450,173 | Frickey | Apr. 3, 1923 |
| 1,459,568 | Blum | June 19, 1923 |
| 1,680,064 | Pope | Aug. 7, 1928 |
| 1,686,128 | Duncan | Oct. 2, 1928 |
| 1,728,392 | Clement | Sept. 17, 1929 |
| 1,767,686 | Litchfield | June 24, 1930 |
| 2,523,994 | McCloy | Sept. 26, 1950 |
| 2,605,106 | Gilmore | July 29, 1952 |
| 2,653,028 | Templeton | Sept. 22, 1953 |
| 2,708,582 | Adams | May 17, 1955 |
| 2,952,466 | Carlson et al. | Sept. 13, 1960 |

FOREIGN PATENTS

| | | |
|---|---|---|
| 1,104,488 | France | June 15, 1955 |
| 70,305 | Germany | Aug. 14, 1893 |
| 299,827 | Germany | Aug. 11, 1917 |